(12) United States Patent
Acosta et al.

(10) Patent No.: US 7,989,403 B2
(45) Date of Patent: Aug. 2, 2011

(54) CORROSION INHIBITORS CONTAINING AMIDE SURFACTANTS FOR A FLUID

(75) Inventors: Erick J. Acosta, Sugar Land, TX (US); Peter A. Webber, Sugar Land, TX (US); Keith A. Monk, League City, TX (US)

(73) Assignee: Nalco Company, Naperville, IL (US)

( * ) Notice: Subject to any disclaimer, the term of this patent is extended or adjusted under 35 U.S.C. 154(b) by 315 days.

(21) Appl. No.: 12/396,096

(22) Filed: Mar. 2, 2009

(65) Prior Publication Data

US 2010/0219379 A1 Sep. 2, 2010

(51) Int. Cl.
*C09K 8/54* (2006.01)
*C09K 15/16* (2006.01)
*C23F 11/00* (2006.01)
*C23F 11/04* (2006.01)
*C23F 11/14* (2006.01)

(52) U.S. Cl. .......... 507/240; 507/239; 507/243; 422/12; 422/16; 252/389.62; 252/390; 252/400.62; 252/401; 252/405; 252/394; 106/14.16; 106/14.26

(58) Field of Classification Search .............. 422/12, 422/16; 252/389.62, 390, 391, 392, 400.62, 252/401, 402, 403; 106/14.16, 14.26; 507/239, 507/240, 243

See application file for complete search history.

(56) References Cited

U.S. PATENT DOCUMENTS

| | | | | |
|---|---|---|---|---|
| 2,980,657 A | * | 4/1961 | Melamed | 526/307 |
| 3,167,554 A | * | 1/1965 | Ernst | 544/357 |
| 3,260,669 A | * | 7/1966 | Schoen | 507/243 |
| 3,932,296 A | * | 1/1976 | Byth | 507/240 |
| 4,253,886 A | * | 3/1981 | Aonuma et al. | 148/105 |
| 4,515,658 A | * | 5/1985 | Fong | 162/168.4 |
| 4,699,951 A | * | 10/1987 | Allenson et al. | 525/194 |
| 4,762,627 A | * | 8/1988 | Martinez et al. | 507/203 |
| 4,784,796 A | * | 11/1988 | Treybig et al. | 252/392 |
| 4,802,992 A | * | 2/1989 | Fong et al. | 210/709 |
| 5,798,023 A | * | 8/1998 | Pruszynski et al. | 162/181.1 |
| 5,922,653 A | * | 7/1999 | Ahmed et al. | 507/242 |
| 6,051,670 A | * | 4/2000 | Ahmed et al. | 526/263 |
| 6,217,778 B1 | * | 4/2001 | Shing et al. | 210/708 |
| 6,905,605 B2 | | 6/2005 | Klomp | |
| 7,253,138 B2 | | 8/2007 | Dahlmann et al. | |
| 2003/0209499 A1 | * | 11/2003 | Haase | 210/728 |
| 2004/0164278 A1 | | 8/2004 | Dahlmann et al. | |
| 2005/0101495 A1 | | 5/2005 | Dahlmann et al. | |
| 2010/0084612 A1 | * | 4/2010 | Acosta et al. | 252/392 |
| 2010/0087338 A1 | * | 4/2010 | Acosta | 507/90 |
| 2010/0087339 A1 | * | 4/2010 | Acosta | 507/90 |
| 2010/0219379 A1 | * | 9/2010 | Acosta et al. | 252/392 |
| 2010/0240618 A1 | * | 9/2010 | Pennell et al. | 514/150 |

FOREIGN PATENT DOCUMENTS

WO 2004111161 A1 12/2004

OTHER PUBLICATIONS

Synthesis, Authors: Yadav, J.S et al. 2007 No. 22 pp. 3447-3450.*

* cited by examiner

*Primary Examiner* — Joseph D Anthony
(74) *Attorney, Agent, or Firm* — Edward O. Yonter; Michael B. Martin

(57) ABSTRACT

A method of inhibiting corrosion in a fluid is disclosed. The method comprises: adding to the fluid an effective corrosion inhibiting amount of a synergist, a synergist when $H_2S$ is present in the fluid, or no synergist when $H_2S$ is present in the fluid, and a composition comprising specified following formula and optionally salts thereof.

20 Claims, No Drawings

CORROSION INHIBITORS CONTAINING AMIDE SURFACTANTS FOR A FLUID

FIELD OF THE INVENTION

The field of the invention pertains to corrosion inhibitors for a fluid, e.g. a fluid in an oil and gas pipeline or refinery.

BACKGROUND OF THE INVENTION

Corrosion of metal surfaces in a fluid has long been a problem for the oil and gas industry. Corrosion in the oil field produces a difficult integrity management challenge for operators and with many fields operating past their design life expectancies, it is extremely important to control corrosion through the use of inhibitors. It is well known that during the production of oil and gas several other corrosive components are present such as brines, organic acids, carbon dioxide, hydrogen sulfide, and microorganisms. Corrosivity to these systems is further magnified by species present in brines, such as organic acids, carbon dioxide (sweet systems), hydrogen sulfide (sour systems), and/or microorganisms, which causes a type of corrosion called microbiologically influenced corrosion or MIC. Other factors that may present problems include high temperatures and pressures, high liquid or gas velocities, solid content, and metal composition. These aggressive constituents can cause severe corrosion to metal pipes, which are often made of low-alloy steels. This problem is even more troublesome in deep-sea operations where replacement of corroded equipment is difficult and costly. Therefore, it is common practice to employ corrosion inhibitors during the production, transportation, storage, and separation of crude oil and natural gas in order to maintain asset integrity, prolong the service life, and protect the environment by reducing/eliminating failures in these systems.

Corrosion inhibitors are usually surface-active compounds that form protective coatings on the surface of metal components, which come in contact with corrosive environments, and thus suppress corrosion. Corrosion inhibitors are compounds, which function to suppress the deterioration of a substance (usually a metal) or its properties caused by reaction with its environment. This occurs as a result of adsorption of the inhibitors to the metal surface, preferentially coating the surface of the metal and forming of a protective film, which modifies the environment at the surface. Common corrosion inhibitors are composed of amines, condensation products of fatty acids with polyamines, e.g. imidazolines or polyamides, and quaternary ammonium compounds. Among the most frequently used corrosion inhibitors in crude oil and natural gas extraction are imidazoline derivatives.

Alternative corrosion inhibitors that can be used alone or in combination with known corrosion inhibitors are being sought by the industry. Further to this point, because of the limited amount and diversity of corrosion inhibitor actives currently available for use in the oil field, newer, high performance, sustainable alternatives are being sought in the industry.

SUMMARY OF THE INVENTION

The present invention provides for a method of inhibiting corrosion in a fluid comprising: adding to the fluid an effective corrosion inhibiting amount of a synergist, a synergist when $H_2S$ is present in the fluid, or no synergist when $H_2S$ is present in the fluid, and a composition comprising the following formula and optionally salts thereof:

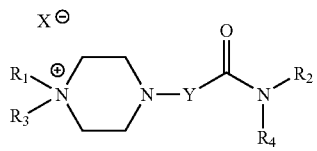

where $R_1$ is $C_nH_{2n+1}$, wherein n=0 to 12; benzyl; acrylate or H;
where $R_2$ is a $C_4$-$C_{22}$ alkyl;
where $R_3$ is $C_nH_{2n+1}$, wherein n=0 to 12; benzyl; or H;
where $R_4$ is $C_nH_{2n+1}$, wherein n=0 to 22; or H
where $X^-$ is an anion, halogen, a carboxylate, or a sulfate and wherein $X^-$ is only present when both $R_1$ and $R_3$ are present;
where $Y=(CH_2)_n$, wherein n=1 to 8; and
wherein $R_3$ and $R_1$ can not be hydrogen or n=0 at the same time.

DETAILED DESCRIPTION OF THE INVENTION

The methodology described above can have various embodiments.

In one embodiment, the compositions contain various amounts of different compositions that fall within the claimed formula.

In another embodiment, the fluid comprises water, gas, and optionally liquid hydrocarbon.

In another embodiment, the alkyl groups of $R_1$ and/or $R_2$ and/or $R_4$ are linear, branched, cyclic, and/or unsaturated or combinations thereof.

In another embodiment, $R_3$ is a methyl or ethyl group. When possible the alkyl groups can be linear or branched.

In another embodiment, the halogen is chlorine, bromine, or iodine. The halogen is in ionic form when it is associated with the composition.

In another embodiment, $Y=(CH_2)_n$, wherein n=1 to 4. When possible the alkyl groups can be linear or branched.

In another embodiment, $R_1$ is a $C_4$-$C_6$ alkyl.
In another embodiment, $R_2$ is a $C_6$-$C_{18}$ alkyl.
In another embodiment, the composition contains the following formula and optionally salts thereof:

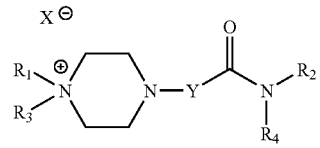

where $R_1$ is $C_4H_9$, $C_6H_{13}$, $C_8H_{17}$, or benzyl;
where $R_2$ is a $C_8H_{17}$, $C_{12}H_{25}$, or $C_{18}H_{35}$;
where $R_3$ is $CH_3$ or $C_2H_5$;
where $R_4$ is $C_nH^{2n+1}$, wherein n=0 to 22; or H
where $X^-$ is an anion, halogen, a carboxylate, or a sulfate and wherein $X^-$ is only present when both $R_1$ and $R_3$ are present;
where $Y=(CH_2)_n$, wherein n=1 to 8; and
wherein $R_3$ and $R_1$ can not be hydrogen or n=0 at the same time.

In a further embodiment, $Y=(CH_2)_n$, wherein n=1 to 2. When possible the alkyl groups can be linear or branched.

In another embodiment, the composition contains the following formula and optionally salts thereof:

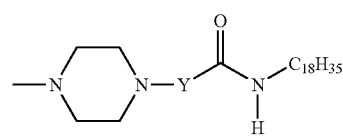

In another embodiment, the composition contains the following formula:

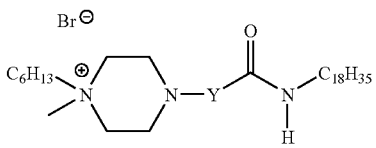

The composition is applied to a fluid that contains various levels of salinity.

In one embodiment, the fluid has a salinity of 1% to 20% weight/weight (w/w) total dissolved solids (TDS).

In another embodiment, the fluid has a salinity of greater that 0% to about 5% w/w TDS. In a further embodiment, the water system is a transit line or a gas system.

The fluid to which the composition is applied to can contain various levels of water cut. One of ordinary skill in the art would interpret water cut to mean the percentage of water in a composition containing an oil and water mixture.

In one embodiment, the water cut is from greater than 0% to 100% volume/volume (v/v).

In another embodiment, the water cut is from 1% to 60% v/v.

Various synthesis methodologies, which can be appreciated by one of ordinary skill in the art, can be utilized to make the claimed compositions. These compositions are then utilized in methods of inhibiting corrosion. The compositions can be made in the presence of a synergist.

In one embodiment, a composition is produced by reacting an alkyl acrylate with 1-methylpiperazine and then subsequently reacting the resulting product with an amine to form an amide and reacting said amide with an alkyl halide.

In a further embodiment, the amine is oleylamine.

In a further embodiment, the alkyl halide is 1-bromohexane.

The compositions of this invention can contain one or more additional chemistries. Various formulations can be appreciated by one of ordinary skill in the art and can be made without undue experimentation.

In one embodiment, the composition farther comprises one or more hydrate inhibitors.

In another embodiment, the composition further comprises one or more thermodynamic hydrate inhibitors, one or more kinetic hydrate inhibitors, one or more anti-agglomerants, or a combination thereof.

In another embodiment, the composition further comprises one or more asphaltene inhibitors, paraffin inhibitors, corrosion inhibitors, scale inhibitors, emulsifiers, water clarifiers, dispersants, emulsion breakers, or a combination thereof.

In another embodiment, the composition further comprises one or more polar or nonpolar solvents or a mixture thereof.

In another embodiment, the composition further comprises one or more solvents selected from isopropanol, methanol, ethanol, heavy aromatic naptha, toluene, ethylene glycol, ethylene glycol monobutyl ether (EGMBE), diethylene glycol monoethyl ether, xylene, kerosene, diesel, isobutanol, heptane, or a combination thereof.

The fluid in which the compositions and/or formulations are applied to can be contained in many different types of apparatuses, especially those that transport a fluid from one point to another point, e.g. in one embodiment, the fluid is contained in an oil and/or gas pipeline.

In another embodiment, the fluid in which the compositions and/or formulations are applied to is in contact with many different types of surfaces that are capable of corrosion, e.g. those in an oil and gas pipelines/refineries, e.g. separation vessels, dehydration units, gas lines, and pipelines; and cooling water systems.

In another embodiment, the compositions and/or formulations are applied to industrial water systems and/or municipal water systems.

The compositions of the present disclosure and/or formulations thereof can be applied to a fluid in various ways that would be appreciated by of ordinary skill in the art. One of ordinary skill in the art would appreciate these techniques and the various locations to which the compositions or chemistries can be applied.

In one embodiment, the compositions and/or formulations are pumped into the oil/gas pipeline by using an umbilical line. In a further embodiment, capillary injection systems can be utilized to deliver surfactants, e.g. corrosion inhibitors. U.S. Pat. No. 7,311,144 provides a description of an apparatus and methods relating to capillary injection, which is herein incorporated by reference. Other manners of injection will be appreciated by one of ordinary skill in the art.

Various dosage amounts of a composition and/or formulation can be applied to the fluid to control corrosion. One of ordinary skill in the art would be able to calculate the amount of corrosion inhibitor for a given situation without undue experimentation. In one particular situation, an effective amount is determined by supplying enough chemistry to form a protective film of adequate thickness.

In one embodiment, the dose range for the corrosion inhibitor that is applied to fluid, e.g. the fluid contained in an oil/gas pipeline, is between 0.1% volume to 2% volume based on water cut.

In a further embodiment, the dosages can be anywhere from 5 ppm to 5,000-10,000 ppm depending on the application, e.g. batch or continuous treatment.

Various types of synergists may be added to the fluid in combination with the composition(s) described above. One of ordinary skill in the art could appreciate how to formulate a synergist and the composition.

In one embodiment, a synergist, a synergist when $H_2S$ is present in a fluid, or no synergist when $H_2S$ is present in the fluid, is added to the fluid with the compositions described above.

In a further embodiment, the fluid is contained in a production stream; in general, the fluid is the total liquid from production and this could contain oil, water, condensate, gas and combinations thereof which flow from the production tubing and are eventually collected in a separation facility.

In another embodiment, the synergist can be a mercaptan, e.g. 2-mercaptoethanol.

In another embodiment, the synergist formulation contains 3.5% v/v of 2-mercaptoethanol and 20% actives of the corrosion inhibitor composition described above.

In another embodiment, the synergist is a sulfur-containing synergist.

In another embodiment, the synergist contains thioglycolic acid.

The examples are not meant to be limiting.

Examples

The wheel box test is a standard laboratory evaluation of corrosion inhibitor formulations used to compare the performance of potential inhibitors in mitigating corrosion of carbon steel under sweet conditions. In theory, the test involves a simple weight loss measurement before and after the experiment to determine corrosion protection of the chemical versus uninhibited samples. This allows the corrosion inhibitors to be evaluated by their relative percent protection. As can be seen below, each of the above examples exhibits corrosion performance at dosages as low as 5 ppm, and each provides moderate protection as the dosages approach 100 ppm.

TABLE 1

Wheel box test results for benzyl ammonium quaternary surfactants

| Example | $R_1$ | $R_2$ | $R_3$ | $R_4$ | Conc., ppm | % Protection |
|---|---|---|---|---|---|---|
| 1 | $C_6H_5CH_2$- (Benzyl) | $CH_3(CH_2)_4CH(CH_3)$- 1-methyl hexyl | $CH_3$- (Methyl) | H | 5 | 26.0 |
| | | | | | 10 | 52.9 |
| | | | | | 25 | 57.9 |
| | | | | | 50 | 61.9 |
| | | | | | 100 | 66.0 |
| 2 | $C_6H_5CH_2$- (Benzyl) | $CH_3(CH_2)_3CH(CH_2CH_3)CH_2$- 2-ethyl hexyl | $CH_3$- (Methyl) | H | 5 | 34.1 |
| | | | | | 10 | 50.9 |
| | | | | | 25 | 60.6 |
| | | | | | 50 | 61.0 |
| | | | | | 100 | 62.8 |
| 3 | $C_6H_5CH_2$- (Benzyl) | $CH_3CH(CH_3)(CH_2)_3CH(CH_3)$- 1,5-dimethyl hexyl | $CH_3$- (Methyl) | H | 5 | 25.2 |
| | | | | | 10 | 56.7 |
| | | | | | 25 | 58.3 |
| | | | | | 50 | 58.1 |
| | | | | | 100 | 62.4 |
| 4 | $C_6H_5CH_2$- (Benzyl) | $CH_3CH(CH_3)(CH_2)_2CH(CH_3)$- 1,4-dimethyl pentyl | $CH_3$- (Methyl) | H | 5 | 35.8 |
| | | | | | 10 | 48.4 |
| | | | | | 25 | 60.9 |
| | | | | | 50 | 60.3 |
| | | | | | 100 | 62.4 |

Table 1 shows the corrosion protection profiles for Examples 1 to 4, which contain benzyl quaternary ammonium groups. These surfactants have different alkyl groups on the $R_2$ position to investigate their structure-activity relationships. Each of the surfactants evaluated exhibit moderate corrosion protection at the higher dosages of 25, 50, and 100 ppm. While it can be seen that Example #1 in table 1 provides the greatest protection, each of these chemicals provide nearly equivalent protection across the dosage range.

TABLE 2

Wheel box test results for butyl ammonium quaternary surfactants

| Example | $R_1$ | $R_2$ | $R_3$ | $R_4$ | Conc., ppm | % Protection |
|---|---|---|---|---|---|---|
| 5 | $C_4H_9$- (Butyl) | $CH_3(CH_2)_4CH(CH_3)$- 1-methyl hexyl | $CH_3$- (Methyl) | H | 5 | 35.3 |
| | | | | | 10 | 46.4 |
| | | | | | 25 | 52.7 |
| | | | | | 50 | 56.3 |
| | | | | | 100 | 58.0 |
| 6 | $C_4H_9$- (Butyl) | $CH_3(CH_2)_3CH(CH_2CH_3)CH_2$- 2-ethyl hexyl | $CH_3$- (Methyl) | H | 5 | 33.8 |
| | | | | | 10 | 43.2 |
| | | | | | 25 | 50.4 |
| | | | | | 50 | 54.2 |
| | | | | | 100 | 56.5 |
| 7 | $C_4H_9$- (Butyl) | $CH_3CH(CH_3)(CH_2)_3CH(CH_3)$- 1,5-dimethyl hexyl | $CH_3$- (Methyl) | H | 5 | 28.1 |
| | | | | | 10 | 36.0 |
| | | | | | 25 | 47.1 |
| | | | | | 50 | 53.3 |
| | | | | | 100 | 56.0 |
| 8 | $C_4H_9$- (Butyl) | $CH_3CH(CH_3)(CH_2)_2CH(CH_3)$- 1,4-dimethyl pentyl | $CH_3$- (Methyl) | H | 5 | 28.9 |
| | | | | | 10 | 43.2 |
| | | | | | 25 | 46.3 |
| | | | | | 50 | 51.8 |
| | | | | | 100 | 54.1 |

Tables 2, 3, and 4 give a comparison to quaternary ammonium surfactants containing pendant butyl, hexyl, and octyl groups respectively. Each of these examples gives comparable results for corrosion protection under the laboratory conditions studied with one exception. Example 13 in Table 3 shows greater corrosion inhibition at 50 and 100 ppm as compared to each of these examples. As one would expect, the oleyl group ($C_{18}$) provides enhanced performance due to the greater lipophilicity of this surfactant as compared to other examples. This would suggest that longer chained alkyl groups, ranging from C12-C18, will provide greater protection than shorter alkyls and branched chains in the 5-6 carbon chain lengths. This is certainly confirmed in literature as the most common corrosion inhibitors for use in the oil field are quaternary ammonium compounds and imidazolines containing longer alkyl chains with varying degrees of unsaturation.

TABLE 3

Wheel box test results for hexyl ammonium quaternary surfactants

| Example | $R_1$ | $R_2$ | $R_3$ | $R_4$ | Conc., ppm | % Protection |
|---|---|---|---|---|---|---|
| 9 | $C_6H_{13}$- (Hexyl) | $CH_3(CH_2)_4CH(CH_3)$- 1-methyl hexyl | $CH_3$- (Methyl) | H | 5 | 39.0 |
| | | | | | 10 | 54.5 |
| | | | | | 25 | 56.7 |
| | | | | | 50 | 58.6 |
| | | | | | 100 | 59.7 |
| 10 | $C_6H_{13}$- (Hexyl) | $CH_3(CH_2)_3CH(CH_2CH_3)CH_2$- 2-ethyl hexyl | $CH_3$- (Methyl) | H | 5 | 34.5 |
| | | | | | 10 | 54.4 |
| | | | | | 25 | 58.7 |
| | | | | | 50 | 59.8 |
| | | | | | 100 | 61.9 |
| 11 | $C_6H_{13}$- (Hexyl) | $CH_3CH(CH_3)(CH_2)_3CH(CH_3)$- 1,5-dimethyl hexyl | $CH_3$- (Methyl) | H | 5 | 35.4 |
| | | | | | 10 | 51.4 |
| | | | | | 25 | 54.6 |
| | | | | | 50 | 58.4 |
| | | | | | 100 | 60.8 |
| 12 | $C_6H_{13}$- (Hexyl) | $CH_3CH(CH_3)(CH_2)_2CH(CH_3)$- 1,4-dimethyl pentyl | $CH_3$- (Methyl) | H | 5 | 40.0 |
| | | | | | 10 | 51.7 |
| | | | | | 25 | 59.2 |
| | | | | | 50 | 60.6 |
| | | | | | 100 | 61.5 |
| 13 | $C_6H_{13}$- (Hexyl) | $CH_3(CH_2)_7CH{=}CH(CH_2)_8$- Oleyl | $CH_3$- (Methyl) | H | 5 | 4.5 |
| | | | | | 10 | 60.7 |
| | | | | | 25 | 68.0 |
| | | | | | 50 | 83.0 |
| | | | | | 100 | 82.9 |

TABLE 4

Wheel box test results for octyl ammonium quaternary surfactants

| Example | $R_1$ | $R_2$ | $R_3$ | $R_4$ | Conc., ppm | % Protection |
|---|---|---|---|---|---|---|
| 14 | $C_8H_{17}$- (Octyl) | $CH_3(CH_2)_4CH(CH_3)$- 1-methyl hexyl | $CH_3$- (Methyl) | H | 5 | 6.8 |
| | | | | | 10 | 39.4 |
| | | | | | 25 | 64.5 |
| | | | | | 50 | 62.8 |
| | | | | | 100 | 66.1 |
| 15 | $C_8H_{17}$- (Octyl) | $CH_3(CH_2)_3CH(CH_2CH3)CH_2$- 2-ethyl hexyl | $CH_3$- (Methyl) | H | 5 | 3.7 |
| | | | | | 10 | 54.8 |
| | | | | | 25 | 57.0 |
| | | | | | 50 | 62.6 |
| | | | | | 100 | 63.0 |
| 16 | $C_8H_{17}$- (Octyl) | $CH_3CH(CH_3)(CH_2)_3CH(CH_3)$- 1,5-dimethyl hexyl | $CH_3$- (Methyl) | H | 5 | 26.2 |
| | | | | | 10 | 43.2 |
| | | | | | 25 | 62.6 |
| | | | | | 50 | 60.5 |
| | | | | | 100 | 70.2 |
| 17 | $C_8H_{17}$- (Octyl) | $CH_3CH(CH_3)(CH_2)_2CH(CH_3)$- 1,4-dimethyl pentyl | $CH_3$- (Methyl) | H | 5 | 32.6 |
| | | | | | 10 | 59.2 |
| | | | | | 25 | 61.8 |
| | | | | | 50 | 63.7 |
| | | | | | 100 | 62.1 |

We claim:

1. A method of inhibiting corrosion of metal surfaces in a fluid comprising: adding to the fluid an effective corrosion inhibiting amount of a synergist, a synergist when $H_2S$ is present in the fluid, or no synergist when $H_2S$ is present in the fluid, and a composition comprising the following formula and optionally salts thereof:

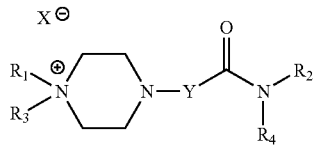

wherein $R_1$ is $C_nH_{2+1}$, wherein n=0 to 12; benzyl; acrylate or H;
wherein $R_2$ is a $C_4$ to $C_{22}$ alkyl;
wherein $R_3$ is $C_nH_{2n+1}$, wherein n=0 to 12; benzyl; or H;
wherein $R_4$ is $C_nH_{2n+1}$, wherein n=0 to 22; or H
wherein $X^-$ is an anion, a halogen, a carboxylate, or a sulfate and wherein $X^-$ is only present when both $R_1$ and $R_3$ are present;
wherein $Y{=}(CH_2)_n$, wherein n=1 to 8; and
wherein $R_3$ and $R_1$ can not be hydrogen or n=0 at the same time.

2. The method of claim 1, wherein the fluid comprises water, gas, and optionally liquid hydrocarbon.

3. The method of claim 1, wherein $R_3$ is a methyl or an ethyl group.

4. The method of claim 1, wherein the halogen is chlorine, bromine, or iodine.

5. The method of claim 1, wherein Y=$(CH_2)_n$, wherein n=1 to 4.

6. The method of claim 1, wherein $R_1$ is a $C_4$-$C_8$ alkyl.

7. The method of claim 1, wherein $R_2$ is a $C_6$-$C_{12}$ alkyl.

8. The method of claim 1 comprising the following formula:

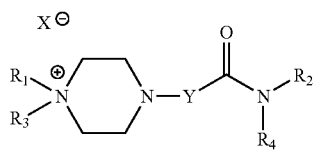

wherein $R_1$ is $C_4H_9$, $C_6H_{13}$, $C_8H_{17}$, or benzyl wherein $R_2$ is a $C_8H_{17}$, $C_{12}H_{25}$, or $C_{18}H_{35}$;

wherein $R_3$ is $CH_3$ or $C_2H_5$;

wherein $R_4$ is $C_nH_{2n+1}$, wherein n=0 to 22; or H wherein $X^-$ is an anion, halogen, a carboxylate, or a sulfate and wherein $X^-$ is only present when both $R_1$ and $R_3$ are present;

wherein Y=$(CH_2)_n$, wherein n=1 to 8; and wherein $R_3$ and $R_1$ can not be hydrogen or n=0 at the same time.

9. The method of claim 8, where Y=$(CH_2)_n$, wherein n is 1 to 2.

10. The method of claim 1, comprising the following formula and optionally salts thereof:

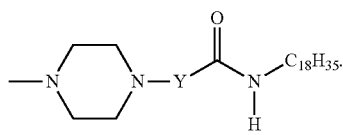

11. The method of claim 1 comprising the following formula:

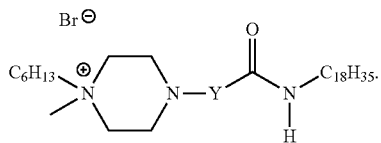

12. A method of inhibiting the corrosion of metal surfaces in a fluid comprising adding to the fluid an effective corrosion inhibiting amount of a synergist a synergist when $H_2S$ is present in the or no synergist when $H_2S$ is present in the fluid, and a composition produced by reacting an alkyl acrylate with 1-methylpiperazine and then subsequently reacting the resulting product with an amine to form an amide and reacting said amide with an alkyl halide.

13. The method of claim 12, wherein said amine is oleylamine.

14. The method of claim 12, wherein the alkyl halide is a 1-bromohexane.

15. The method of claim 1, wherein the fluid is in an oil field application.

16. The method of claim 1, wherein the composition further comprises one or more hydrate inhibitors.

17. The method of claim 1, wherein the composition further comprises one or more thermodynamic hydrate inhibitors, one or more kinetic hydrate inhibitors, one or more anti-agglomerates, or a combination thereof.

18. The method of claim 1, wherein the composition further comprises one or more asphaltene inhibitors, paraffin inhibitors, corrosion inhibitors, scale inhibitors, emulsifiers, water clarifiers, dispersants, emulsion breakers, or a combination thereof.

19. The method of claim 1, wherein the composition further comprises one or more polar or nonpolar solvents or a mixture thereof.

20. The method of claim 1, wherein the composition further comprises one or more solvents selected from isopropanol, methanol, ethanol, heavy aromatic naptha, toluene, ethylene glycol, ethylene glycol monobutyl ether (EGMBE), diethylene glycol monoethyl ether, xylene, kerosene, diesel, isobutanol, heptane, or a combination thereof.

* * * * *